(No Model.) 3 Sheets—Sheet 1.
G. W. GRIFFIN.
MACHINE FOR MAKING SAWS.

No. 339,641. Patented Apr. 13, 1886.

(No Model.) 3 Sheets—Sheet 3.
G. W. GRIFFIN.
MACHINE FOR MAKING SAWS.
No. 339,641. Patented Apr. 13, 1886.
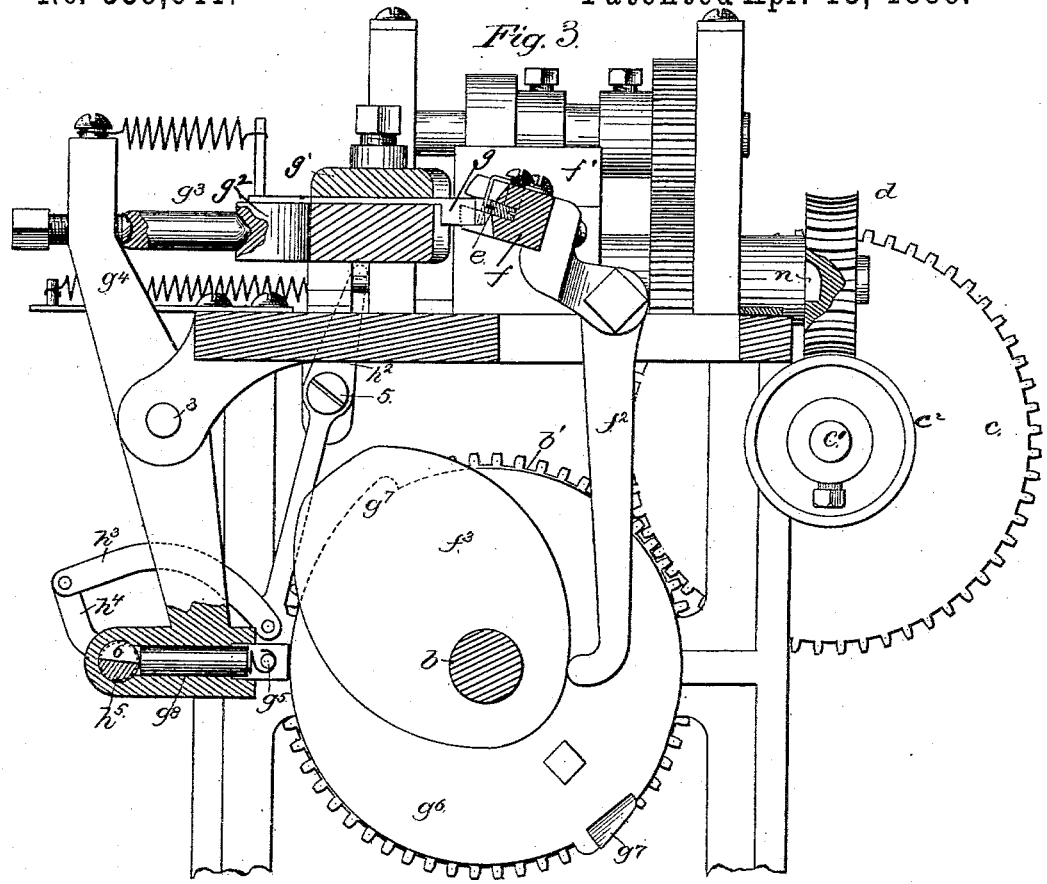
Fig. 3.
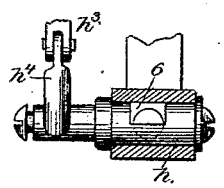
Fig. 5.
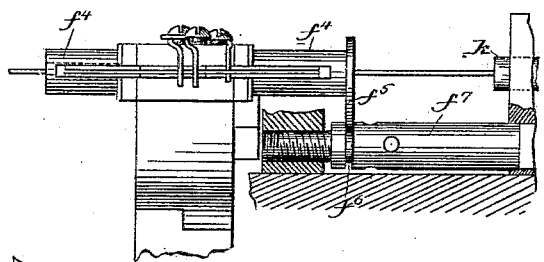
Fig. 4.
Fig. 6.
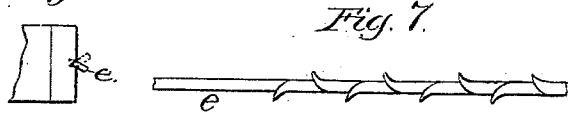
Fig. 7.
Witnesses.
John F. C. Prinkert
Bernice J. Noyes
Inventor.
George W. Griffin
by Crosby & Gregory
Attys.

UNITED STATES PATENT OFFICE.

GEORGE W. GRIFFIN, OF FRANKLIN FALLS, NEW HAMPSHIRE.

MACHINE FOR MAKING SAWS.

SPECIFICATION forming part of Letters Patent No. 339,641, dated April 13, 1886.

Application filed December 1, 1881. Serial No. 46,901. (No model.)

*To all whom it may concern:*

Be it known that I, GEORGE W. GRIFFIN, of Franklin Falls, county of Merrimac, State of New Hampshire, have invented an Improvement in Machines for Making Saws, of which the following description, in connection with the accompanying drawings, is a specification.

My invention consists in certain improvements, hereinafter particularly set forth and claimed, on the invention set forth in United States Letters Patent No. 190,142, dated May 11, 1877.

Figure 1:
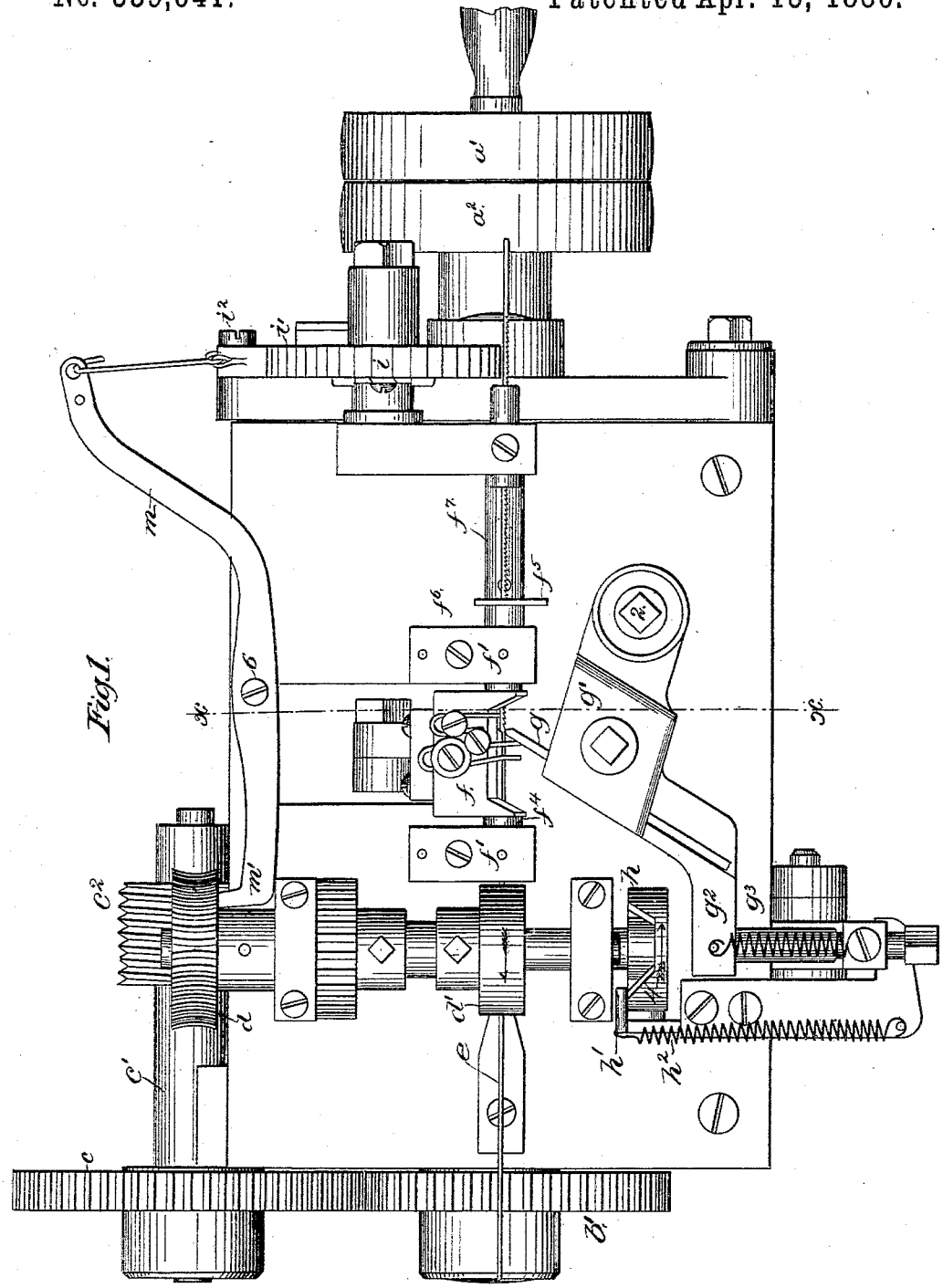
Figure 2:
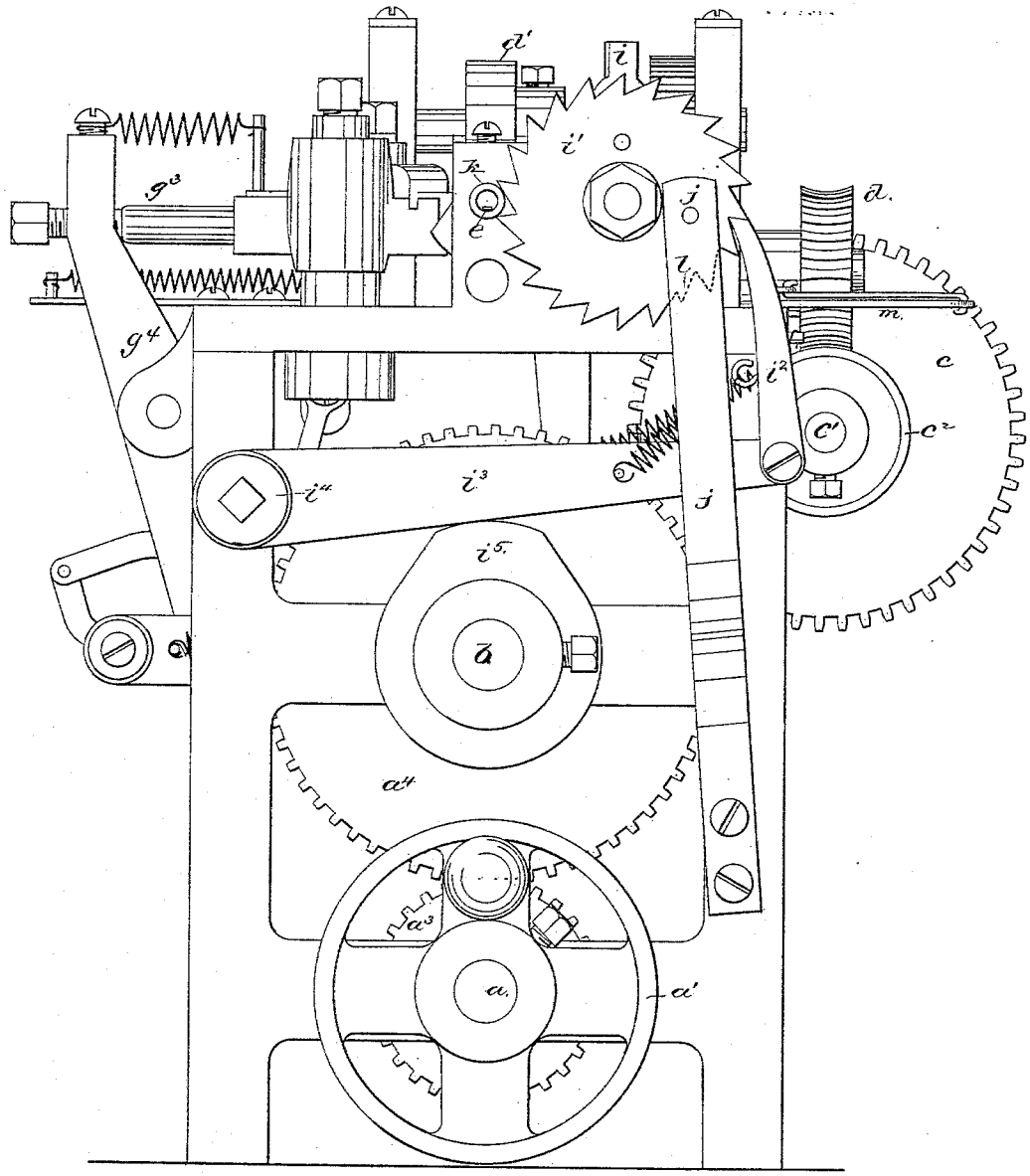

Figure 1 is a plan view of a machine for producing saws, embodying this invention; Fig. 2, an end elevation thereof; Fig. 3, a vertical section thereof; Fig. 4, a detail showing the rocking block or guide for the strip being toothed; Fig. 5, a detail of the cutter-disengaging device; Fig. 6, a detail showing the head of the cutter and the manner in which the blade is presented to it, and Fig. 7 a portion of one of the blades enlarged.

The main driving-shaft $a$, provided with the usual fast and loose pulleys, $a'$ $a^2$, is connected by gears $a^3$ $a^4$ with the main cam-shaft $b$, provided with a gear, $b'$, meshing with a gear, $c$, on a shaft, $c'$, provided with a worm, $c^2$, which actuates a worm-gear, $d$, driving the feed-rolls $d'$, by which the strip $e$, to be formed into saw-blades, receives a uniform forward movement relative to the rotary movement of the cam-shaft $b$. From the said feed-rolls the strip $e$ is led into the guiding-block $f$, pivoted in bearings $f'$, and having adjustably connected therewith a downwardly-extended arm, $f^2$, resting on a cam, $f^3$, upon the shaft $b$ in such manner that the said block $f$ and strip $e$ thereon are rocked backward and forward once at each revolution of the shaft $b$, changing the angular position of the said strip, as shown in Fig. 6, its edge lying in the axis of movement of the block $f$, the bearing portions $f^4$ of which it traverses longitudinally, being made tubular for that purpose. One of the said pivots or bearing portions $f^4$ of the guiding-block is provided with a wing, $f^5$, entering a groove, $f^6$, in an adjustable thrust-block, $f^7$, which operates to prevent the longitudinal movement of the said guiding-block when the strip $e$ therein is acted upon by the cutter.

The tooth-cutting tool $g$ is mounted in a tool-carrier, $g'$, pivoted at 2, and provided with an arm, $g^2$, connected by a thrust-bar, $g^3$, with one end of a lever, $g^4$, pivoted at 3, and provided at its other end with a movable foot, $g^5$, resting upon an actuating-cam, $g^6$, which is provided with two operating projecions, $g^7$, which, in acting upon the said foot $g^5$, press the cutter $g$ in toward the strip $e$, held in the block $f$, as shown in Fig. 1, the said projections $g^7$ being so located relative to the cam $f^3$ that the cutter $g$ is thrust forward when the block $f$ and strip $e$ are at the end of their oscillating movement, as indicated in Fig. 6, so that the cutter $g$ acts alternately upon the opposite edges or corners of the blade $e$, turning up the metal to form teeth, as shown in Fig. 7.

When it is desired to make a series of independent blades, the cutter $g$ is thrown out of operation during a portion of the feeding movement of the strip $e$, as follows: A disengaging-cam, $h$, carried by the shaft of one of the feed-rolls $d'$, has a portion of its periphery removed, as shown at 4, Fig. 1. A pin, $h'$, resting on the periphery of the said cam $h$ and controlled thereby, is connected with the lever $h^2$, pivoted at 5, and connected at its other end by a link, $h^3$, with the arm $h^4$ of a cylindrical block, $h^5$, (see Figs. 3 and 5,) notched, as shown at 6, so that when the pin $h'$ of the lever $h^2$ enters the portion 4 of the cam $h$ the stem $g^8$ of the movable foot $g^5$ enters the said notch 6, and the said foot $g^5$ is withdrawn from the path of its actuating-cam $g^6$, and the cutter $g$ ceases to operate until the notched portion 4 of the cam $h$ has passed the pin $h'$, during which time a considerable length of the strip $e$ will have been fed by the end of the said cutter $g$ without being acted upon thereby. The strip $e$ is severed in the middle of the unnotched portion by the cutting-off mechanism, (best shown in Fig. 2,) it consisting of a severing-cutter, $i$, mounted on a ratchet-wheel, $i'$, actuated by a pawl, $i^2$, carried at the end of a lever, $i^3$, pivoted at $i^4$ and oscillated by a cam, $i^5$, on the shaft $b$, the wheel $i'$ being thus rotated for the space of one tooth at each revolution of the cam-shaft $b$. A brake or friction device, $j$, pressing against the face of the wheel $i'$, prevents its backward rotation. The cutter $i$ is thus carried, in the rotary movement of the wheel $i'$, past the end of the guide-tube $k$, through which the strip $e$ passes after being provided with teeth, it thus shearing off the said strip; and in order to insure the proper timing of the severing-cutter $i$ relative to the feeding devices and disengaging-cam $h$, so that it will operate upon the blank or untoothed portion of the strip, the ratchet $i'$ is provided with a shallow tooth, $l$, which does not project far enough to be engaged by the pawl $i^2$ in its normal operation, the said pawl being held back by a lever, $m$, (see Fig. 1,) pivoted at 6, and provided with a finger, $m'$, resting on the face of the worm-wheel $d$. By this means the ratchet-wheel $i'$ is rotated until the cutter $i$ is brought within one or two steps of the guide $k$, when the pawl $i^2$ plays backward and forward over the top of the short tooth $l$, without engaging it or moving far enough to engage the next tooth, until a recess, $n$, (shown in Fig. 3,) in the worm-gear $d$ receives the finger $m'$ of the lever $m$, and thus permits the pawl $i^2$ to advance far enough toward the center of the ratchet $i'$ to engage the short tooth $l$ thereof, thus moving the ratchet far enough forward to permit the pawl $i$ to engage the succeeding tooth and operate for another revolution in the usual manner, the time of action of the cutter $i$ upon the strip $e$ being thus controlled directly from the feeding mechanism.

The weight of the lever $i^3$ and arm $f^2$ is sufficient to hold them to the acting surfaces of their cams, and in the other portions of the apparatus springs are employed for this purpose, as clearly shown in the drawings.

I claim—

1. In an organized machine for making saws, the following elements in combination: the feeding mechanism to move a continuous strip forward, the guide-block for the said strip, and means to oscillate it as described, and the cutter to act upon the said strip in the guide-block at the end of each oscillation thereof, substantially as and for the purpose set forth.

2. The feeding mechanism, oscillating guide-block and cutter, combined with disengaging mechanism, substantially as described, for the said cutter controlled by the said feeding mechanism, whereby untoothed spaces are left in the strip being fed, as and for the purpose set forth.

3. The strip-feeding mechanism, oscillating guide-block for said strip, and tooth-forming cutter, combined with an intermittingly-operating severing-cutter, whereby the said strip provided with teeth is severed to form independent blades of uniform length, substantially as described.

4. In a saw-making machine, the main cam-shaft and mechanism connected therewith for feeding a strip to be provided with teeth, a severing-cutter for cutting the strip transversely into sections, and actuating mechanism therefor operated by said cam-shaft, combined with means connected with the feeding mechanism to control the time of operation of the said severing-cutter, substantially as and for the purpose described.

In testimony whereof I have signed my name to this specification in the presence of two subscribing witnesses.

GEORGE W. GRIFFIN.

Witnesses:
ALEXIS PROCTOR,
FRANK PROCTOR.